United States Patent [19]

Weber et al.

[11] Patent Number: 4,767,913
[45] Date of Patent: Aug. 30, 1988

[54] AUTOMATIC GAS DETECTOR FOR ARC WELDER

[75] Inventors: Bruce W. Weber, Portage; Caroll E. Gustafson, Chesterton, both of Ind.; James A. Bice, Santa Ana Heights, Calif.

[73] Assignee: Amoco Corporation, Chicago, Ill.

[21] Appl. No.: 863,346

[22] Filed: May 15, 1986
(Under 37 CFR 1.47)

[51] Int. Cl.[4] ............................................. B23K 9/10
[52] U.S. Cl. ............................... 219/130.21; 219/136
[58] Field of Search ................. 219/130.21, 136, 132; 340/632, 633, 634; 361/170; 73/23, 26

[56] References Cited

U.S. PATENT DOCUMENTS

| | | | |
|---|---|---|---|
| 2,881,274 | 4/1959 | Ray | 340/632 |
| 3,471,264 | 10/1969 | Crozier | 340/633 |
| 3,609,732 | 9/1971 | Kasahara et al. | 361/170 |
| 4,100,390 | 7/1978 | Jackson | 219/132 |
| 4,129,030 | 12/1978 | Dolan | 73/23 |
| 4,352,087 | 9/1982 | Wittmaier | 340/634 |
| 4,358,949 | 11/1982 | MacFarland et al. | 73/23 |

*Primary Examiner*—Clifford C. Shaw
*Attorney, Agent, or Firm*—Thomas W. Tolpin; William H. Magidson; Ralph C. Medhurst

[57] ABSTRACT

An automatic gas detector is provided for a welding machine. The automatic gas detector is safe, efficient and effective and particularly useful in oil refineries and petrochemical plants. The automatic gas detector includes a gas monitor for detecting combustible gases, a circuit interrupter connected in a power supply circuit between a power source and the welding machine, and a circuit connected to the gas monitor and the circuit interrupter to de-energize the power source when the gas monitor senses a dangerous level of combustible gas.

9 Claims, 1 Drawing Sheet

AUTOMATIC GAS DETECTOR FOR ARC WELDER

BACKGROUND OF THE INVENTION

The present invention relates to an automatic gas detector and more particularly, to a safety circuit for de-energizing a welding machine, upon sensing a dangerous level of combustible gas.

Heretofore in the use of welding machines in environments where combustible gases may be present, such as in and around an oil refinery, conventional audible and/or visual (red light) gas monitor alarm devices have not always been effective in warning a welder of the existence of a dangerous level of combustible gas. The noise from welding machines and surrounding equipment in industries such as at oil refineries, are often so loud as to prevent the welder from safely hearing an audible alarm. Visual lights, if present, are often ineffective because the welder typically faces a different direction during his work and his vision is blocked by his mask as well as by surrounding equipment.

A dangerous situation exists when combustible gases are present with the use of welding machines. Under such circumstances, the arc welding machines can cause a fire, explosion, or detonation which could seriously damage life, limb and property.

The automatic gas monitor of the present invention solves the above problem by providing a gas monitoring apparatus (system) which will automatically de-energize an arc welder when a dangerous level of combustible gas is detected at the site of arc welding.

Detectors for sensing the presence of combustible gas have been known for some time. Examples of some of the previously proposed gas detector systems are disclosed in the following U.S. Pat Nos.:

| U.S. PAT. NO. | PATENTEE |
|---|---|
| 2,881,274 | Ray |
| 3,471,264 | Crozier |
| 3,609,732 | Kasahara et al |
| 4,129,030 | Dolan |

The Ray U.S. Pat. No. 2,881,274 discloses a gas detecting device comprising a pair of bimetal members and means for heating one of the members with the heating means being influenced by the presence of hydrocarbon gases in the surrounding atmosphere for increasing the heating effect when such gases are present. Deflection of the bimetal member will energize a relay which will then energize a circuit for energizing an alarm or a control element.

The Crozier U.S. Pat. No. 3,471,264 discloses a gas detection device including a gas sensing wire which is heated to a temperature in the neighborhood of 850° to 900° F. and which, when exposed to combustible gas, will, as a result of the burning of the gas, increase its temperature to a value as high as 1500° F. This will cause rotation of a drum associated with the wire which will activate a circuit to operate an audible and/or visual alarm.

The Kasahara et al U.S. Pat. No. 3,609,732 discloses a gas responsive switching device for detecting gas concentrations in the air using a heated semiconductor. The gas detector is coupled to two relays, one of which can be used to operate a ventilating fan and the other of which can be used to operate an alarm.

The Dolan U.S. Pat. No. 4,129,030 discloses a sensing apparatus for sensing gases. The sensing apparatus includes a relay which is operated when a certain level of gas is detected. The sensing apparatus includes a bridge circuit and an indicating means for detecting current changes in the bridge circuit. The indicating means can include an alarm to alert people in the area of the presence of a detected gas.

None of the above patents, however, disclose a system which de-energizes a welding machine when a dangerous level of gas is present.

SUMMARY OF THE INVENTION

A novel welding safety device is provided which is particularly useful in oil refineries and petrochemical plants. Advantageously, the welding safety device is effective, efficient, safe, and easy to use.

The welding safety device comprises a special automatic gas detector with a gas sensor for detecting the level of combustible gases, a welding machine, a power source, and a circuit for automatically de-energizing power to the welding machine when the gas detector senses a dangerous level of combustible gases.

A more detailed explanation of the invention is provided in the following description and appended claims taken in conjunction with the accompanying drawings.

DESCRIPTION OF THE PREFERRED EMBODIMENT

Figure 1:
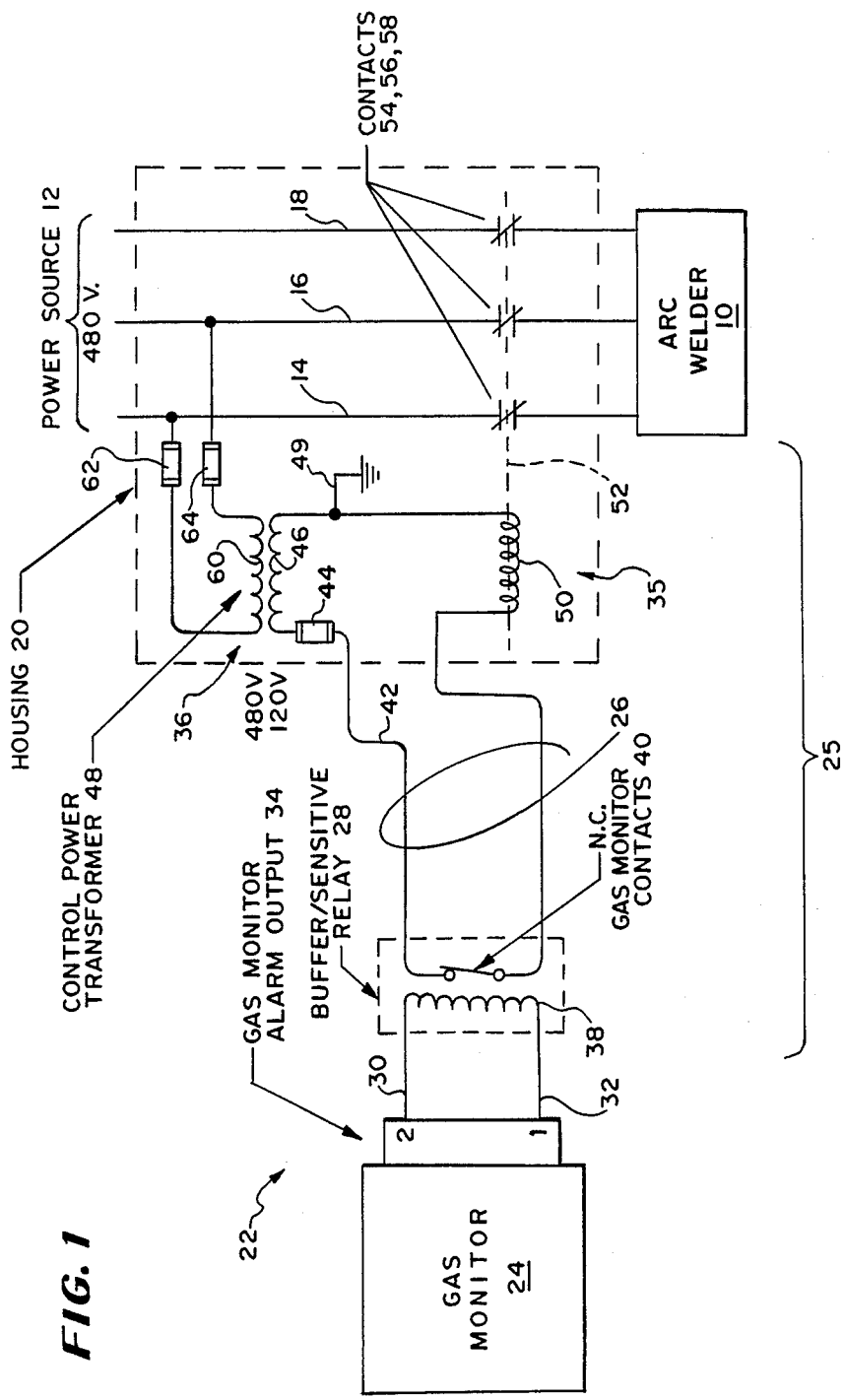
FIG. 1 is a schematic circuit diagram of an automatic gas detector for an arc welder constructed according to the teachings of the present invention.

Referring now to the Drawing in greater detail, there is illustrated in FIG. 1, an arc welding machine (arc welder) 10 of the type which is utilized in an oil refinery. Such machine 10 is provided for welding metal, such as pipes, structural members, vessels, and tanks.

The arc welding machine 10 is supplied by a three phase 480 volt power source 12 through three power supply lines 14, 16 and 18 which pass through an explosion proof housing enclosure 20.

An arc welding safety device comprising an automatic gas detector 22 provides automatic safety controls for use with the arc welding machine 10. The gas detector 22 includes an automatic battery operated gas monitor 24 located upwind of the arc welding machine 10 and a coupling circuit 25 having a signal cable 26 with a relay 28 mounted therein. The coupling circuit 25 is connected between outputs 30 and 32 of a gas monitor alarm output circuit 34 forming part of the gas monitor. A circuit interrupter 35 in the control circuit 36 is mounted within the housing 20.

When output circuit 34 is energized a current is applied to a coil 38 in the relay 28 within the signal cable 26 to cause normally closed gas monitor contacts 40 to open.

One of the contacts 40 is connected via a line conductor 42 in the signal cable 26 through a fuse 44 of the control circuitry 36 in the housing 20 to one end of a secondary coil 46 of a control power transformer 48 forming part of the control circuit 36 and mounted within the housing 20. The other end of the coil 46 is connected to ground 49 and to one end of a contactor coil 50 of the circuit interrupter 35, the other end of which is connected to the other contact of the contacts 40.

The contactor coil 50 of the circuit interrupter 35 has an armature 52 which, when the coil 50 is energized, will close three sets of contacts 54, 56 and 58 located, respectively, in each of the power supply lines 14, 16 and 18 passing through the housing 20. Then, when the coil 50 is de-energized upon opening of the relay contacts 40, the armature 52 will be caused to move in a direction to open circuit the contacts 54, 56 and 58.

The control circuit 36 further includes a primary winding 60 of the power transformer 48. The primary winding 60 is connected at one end through a fuse 62 to the power supply line 14 and at the other end through a fuse 64 to the power supply line 16.

In use, when there is no gas in the area of the arc welding machine 10 the relay contacts 54, 56 and 58 are closed so that the supply of energy from the power source 12 to the arc welding machine 10 is uninterrupted. At the same time, a small amount of current is supplied from the power lines 14 and 16 through the primary winding 60 of the control power transformer 48 to energize the secondary winding 46 which supplies a current through both the fuse 44 and the relay contacts 40 via the contactor coil 50 within the housing 20 and causes the armature 52 to maintain the relay contacts 54, 56 and 58 in a closed position.

The battery operated gas monitor 24 operates independently of the power source 12 and of any other A.C. power source. When a combustible gas is sensed by the gas monitor 24, a voltage is established across the outputs 30 and 32 to supply a current through the relay coil 38 which causes opening of the normally closed gas monitor contacts 40. When this occurs, the relay coil 50 of the circuit interrupter 35 is de-energized so as to cause the armature 52 to move in a direction to open the relay contacts 54, 56 and 58 in order to open the circuit and interrupt the supply of power from the power lines 14, 16 and 18 to the arc welding machine 10.

With the automatic gas detector 22 of the present invention, a weldor does not have to be aware of a visual or audio alarm indicating the presence of a dangerous level of combustible gas. Instead, the automatic gas detector 22 automatically de-energizes the arc welding machine 10 to prevent any explosion. This is important, since the noise from arc welding as well as the distractions and noise from operating machinery and refinery equipment, as well as from other personnel, often prevents the welder from hearing or seeing an alarm. The welding hood has a dark lens which, together with the bright light from the arc, typically prevents the welder from seeing a visual alarm.

From the foregoing description, it will be apparent that the automatic gas detector of the present invention has a number of advantages, some of which have been described above and others of which are inherent in the invention.

Also, it will be understood that modifications can be made to the automatic gas detector of the present invention without departing from the teachings of the invention.

Accordingly, the scope of the invention is only to be limited as necessitated by the accompanying claims.

We claim:

1. An automatic gas detector for an arc welder, comprising:
   means for detecting combustible gases, circuit interrupting means connected in a power supply circuit between a power source and an arc welder, and means coupled between said gas detection means on said circuit interrupting means for causing said circuit interrupting means to be operated to interrupt the power supply circuit between the power source and the arc welder when the gas detecting means senses a dangerous level of combustible gas.

2. The automatic gas detector of claim 1 wherein said gas detecting means is a battery operated gas monitor.

3. The automatic gas detector of claim 1 wherein said means for coupling said gas detecting means to said circuit interrupting means includes a signal cable having a relay therein.

4. The automatic gas detector of claim 1 wherein said gas detecting means comprises a battery operated gas monitor and said means for coupling said gas detecting means to said circuit interrupting means includes a signal cable, said signal cable comprising a relay having a relay coil therein coupled across outputs of said gas monitor and normally closed gas monitored contacts, said circuit interrupting means including an interrupter relay coil connected in series with said gas monitor contacts and including relay contacts in each power supply line in the power supply circuit between the power source and the arc welder and an armature which, when the circuit interrupter relay coil is energized, maintains the contacts closed and which, when the circuit interrupter coil is open circuited as a result of the gas monitor contacts being opened upon energization of the relay in the signal cable, open circuits the contacts in the power supply lines.

5. The automatic gas detector of claim 4 wherein said circuit interrupting means is supplied with voltage and current from a secondary winding of a power transformer which has a primary winding in a supply circuit coupled across two power supply lines in the power supply circuit between said power source and said arc welder.

6. The automatic gas detector of claim 5 wherein said coupling circuit includes a fuse between said secondary winding and said gas monitor relay contacts.

7. The automatic gas detector of claim 5 wherein said primary winding supply circuit includes fuse protection means.

8. A welding safety system, comprising:
   a welding machine;
   a power source for supplying power to said welding machine;
   a gas sensor for detecting the concentration and level of combustible gases;
   an interrupting circuit operatively connected to said power source and said arc welding machine; and
   a decoupling circuit operatively associated with said gas sensor for activating said interrupting circuit and shutting off said supply of power to said welding machines when said gas sensor detects a dangerous concentration and level of combustible gases.

9. An arc welder and gas detector assembly comprising: an alternating current power supply;
   an arc welder;
   a control coil;
   a contactor having normally open contacts connected to said power supply and to circuitry of said arc welder to selectively supply alternating current to said arc welder when said control coil mechanically coupled to said contactor is energized;

a combustible gas detector mounted up wind of said arc welder, said gas detector providing a gas signal when combustible gas is detected;

an interrupter circuit connected to said gas detector and said contactor, said interrupter circuit including a normally closed interrupter contact which is connected in series with said control coil of said contactor, said interrupter circuit, on receipt of said gas signal, causing said interrupter contact to open and interrupt the supply of power to said arc welder.

* * * * *

UNITED STATES PATENT OFFICE
CERTIFICATE OF CORRECTION

Patent No. 4,767,913    Dated August 30, 1988

Inventor(s) Bruce W. Weber, Carrol E. Gustafson, and James A. Rice

It is certified that error appears in the above-identified patent and that said Letters Patent is hereby corrected as shown below:

| Column | Line | |
|--------|------|---|
| 4 | 1 | "on" should read --and-- |
| Title page: item 75 | | "Bice" should read --Rice-- |
| item 75 | | "Caroll" should read --Carrol-- |

Signed and Sealed this

Twenty-sixth Day of June, 1990

*Attest:*

HARRY F. MANBECK, JR.

*Attesting Officer*  *Commissioner of Patents and Trademarks*